(12) United States Patent
Yu et al.

(10) Patent No.: US 11,395,143 B2
(45) Date of Patent: Jul. 19, 2022

(54) NETWORK ACCESS METHOD AND APPARATUS AND NETWORK DEVICE

(71) Applicant: HUAWEI TECHNOLOGIES CO., LTD., Guangdong (CN)

(72) Inventors: Youyang Yu, Shanghai (CN); Hua Li, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 307 days.

(21) Appl. No.: 16/566,690

(22) Filed: Sep. 10, 2019

(65) Prior Publication Data
US 2020/0007543 A1 Jan. 2, 2020

Related U.S. Application Data

(63) Continuation of application No. PCT/CN2018/083565, filed on Apr. 18, 2018.

(30) Foreign Application Priority Data

Apr. 18, 2017 (CN) .......................... 201710253160.0

(51) Int. Cl.
*H04L 29/06* (2006.01)
*H04W 12/06* (2021.01)
(Continued)

(52) U.S. Cl.
CPC ......... *H04W 12/068* (2021.01); *H04L 9/3239* (2013.01); *H04L 12/66* (2013.01);
(Continued)

(58) Field of Classification Search
None
See application file for complete search history.

(56) References Cited

U.S. PATENT DOCUMENTS

| 9,480,093 B2* | 10/2016 | Fan ..................... H04L 12/4633 |
| 2007/0133558 A1* | 6/2007 | Wu ..................... H04L 12/2859 |
| | | 370/395.5 |

(Continued)

FOREIGN PATENT DOCUMENTS

| CN | 102026194 A | 4/2011 |
| CN | 102892170 A | 1/2013 |

(Continued)

OTHER PUBLICATIONS

Mamakos et al., "A Method for Transmitting PPP Over Ethernet (PPPoE)", RFC 2516, Feb. 1999, p. 1-17. (Year: 1999).*

(Continued)

*Primary Examiner* — Jeffery L Williams
(74) *Attorney, Agent, or Firm* — Womble Bond Dickinson (US) LLP (57) ABSTRACT

This application discloses a network access method and apparatus, and a network device. The network access method is performed by an access gateway, includes: receiving a PPPoE message or a IPoE message sent by a user terminal, obtaining access information included in the PPPoE message or the IPoE message; encapsulating the access information into an NAS message or an EAP message; then, sending the NAS message or the EAP message to a control plane function entity CP; receiving network interface information sent by the CP; and sending the network interface information to the user terminal, so that the user terminal accesses a network. As can be learned from this solution, the user terminal is not limited by a protocol stack when accessing the network. Therefore, full services can be provided by deploying only one core network. This not only saves a resource but also facilitates network maintenance.

21 Claims, 4 Drawing Sheets

(51) Int. Cl.

| | | |
|---|---|---|
| *H04L 9/32* | (2006.01) | |
| *H04L 12/66* | (2006.01) | |
| *H04L 41/0806* | (2022.01) | |
| *H04L 61/5014* | (2022.01) | |
| *H04L 61/503* | (2022.01) | |
| *H04L 9/40* | (2022.01) | |
| *H04L 101/622* | (2022.01) | |
| *H04L 69/325* | (2022.01) | |

(52) U.S. Cl.
CPC ........ *H04L 41/0806* (2013.01); *H04L 61/203* (2013.01); *H04L 61/2015* (2013.01); *H04L 63/083* (2013.01); *H04L 63/0884* (2013.01); *H04L 61/6022* (2013.01); *H04L 63/0892* (2013.01); *H04L 69/325* (2013.01)

(56) References Cited

U.S. PATENT DOCUMENTS

| | | | | |
|---|---|---|---|---|
| 2007/0203999 | A1* | 8/2007 | Townsley | ............ H04L 29/1282 709/207 |
| 2009/0282152 | A1* | 11/2009 | Zhang | ............... H04L 29/12839 709/227 |
| 2014/0059544 | A1 | 2/2014 | Koganty et al. | |
| 2015/0282226 | A1* | 10/2015 | Fan | ...................... H04L 67/141 370/329 |
| 2020/0007543 | A1* | 1/2020 | Yu | .......................... H04L 12/66 |

FOREIGN PATENT DOCUMENTS

| | | |
|---|---|---|
| CN | 103687049 A | 3/2014 |
| EP | 1502388 B1 | 12/2007 |
| JP | 2005524341 A | 8/2005 |
| JP | 2014155038 A | 8/2014 |
| JP | 2014212463 A | 11/2014 |
| JP | 2014238664 A | 12/2014 |
| WO | 03094438 A1 | 11/2003 |

OTHER PUBLICATIONS

3GPP, 3rd Generation Partnership Project; Technical Specification Group Services and System Aspects; Procedures for the 5G System; Stage 2 (Release 15), 3GPP TS 23.502 V0. 2.0, Feb. 24, 2017, pp. 24-37, 44-50.

XP055636828 Annie Gravey,"Deliverable D3.5: Assessment of candidate architectures for functional convergence", Combo, dated May 31, 2016,total 138 pages.

XP051230767 3GPP TS 23.502 V0.2.0 (Feb. 2017),3rd Generation Partnership Project; Technical Specification Group Services and System Aspects;Procedures for the 5G System;Stage 2;(Release 15),total 72 pages.

XP051205556 S2-17 0116 Huawei. HiSilicon,"RegisliaLion procedure via untrusted non-3GPP",3GPP TSG SA WG2 Meeting #118bis,Jan. 16-20, 2017, Spokane, USA,total 6 pages.

XP015118910 S. Kanugovi et al.,"Control Plane Protocols and Procedures for Multiple Access Management Services draft-zhu-intarea-mams-control-protocol-01",Internet-Draft,dated Mar. 27, 2017,total 20 pages.

3GPP TS 23.003 V14.3.0 ; 3rd Generation Partnership Project; Technical Specification Group Core Network and Terminals; Numbering, addressing and identification; (Release 14) Mar. 2017; total 106 pages.

3GPP TS 23.501 V0.3.1 (Mar. 2017),3rd Generation Partnership Project;Technical Specification Group Services and System Aspects-;System Architecture for the 5G System;Stage 2(Release 15),total 97 pages.

\* cited by examiner

NETWORK ACCESS METHOD AND APPARATUS AND NETWORK DEVICE

CROSS-REFERENCE TO RELATED APPLICATIONS

This application is a continuation of International Application No. PCT/CN2018/083565, filed on Apr. 18, 2018, which claims priority to Chinese Patent Application No. 201710253160.0, filed on Apr. 18, 2017. The disclosures of the aforementioned applications are hereby incorporated by reference in their entireties.

TECHNICAL FIELD

This application relates to the field of communications technologies, and in particular, to a network access method and apparatus, and a network device.

BACKGROUND

Currently, with improvement of a function of UE (user equipment), the UE is widely used to perform a network operation. Before the UE is used to perform the network operation, the UE usually should be enabled to access a network. In the prior art, the UE may access the network through a core network provided by an operator. To prevent unauthorized UE from accessing the network and to ensure security of authorized UE, a network access authentication function is set in the core network. When access information sent by the UE is received, network access authentication is usually performed on the UE, to verify whether an identity of the UE is authenticated. After authentication succeeds, a network port is allocated to the UE, to enable the UE to access the network.

Specifically, the core network supports a particular type of protocol stack, and a control entity and an authentication entity are disposed in the core network. When to-be-authenticated UE sends access information to the core network, the control entity of the core network extracts a parameter from the access information based on a corresponding protocol type, and performs a subsequent operation. For example, a fixed network core network supports a PPPoE (Point to Point Protocol over Ethernet)/IPoE (internet Protocol over Ethernet) protocol stack. When the fixed core network receives access information of UE, a BNG (broadband network gateway) control device disposed in the fixed core network extracts a UE identifier and an authentication parameter from the access information based on a PPPoE/IPoE protocol type, and sends the extracted authentication parameter to an AAA (authorization, and accounting function) device for performing authentication. After performing authentication on the authentication parameter, the AAA sends an authentication result to the BNG. If the authentication succeeds, the BNG obtains an IP (internet Protocol) address from a DHCP (dynamic host configuration protocol) server, and sends the IP address to the UE by using the PPPoE/IPoE protocol type, so that the UE accesses the network by using the IP address.

Certainly, in addition to the fixed core network, in the prior art, the UE may also access a mobile network (briefly referred to as mobile) core network. However, the mobile core network does not support the protocol stack of the PPPoE/IPoE. Therefore, the fixed and mobile core networks cannot be compatible with each other. If an operator provides full services, both the fixed and the mobile core networks, need to be deployed. This requires a large amount of resources and inconvenient maintenance.

SUMMARY

This application provides a network access method and apparatus, and a network device, to resolve a problem of incompatibility of fixed and mobile core networks.

According to a first aspect, this application provides a network access method. When an access gateway receives a message sent by a user terminal, the access gateway may first determine a type of the message, to determine whether the message is a PPPoE message or an IPoE message, or an NAS message or an extensible authentication protocol (EAP) message. When the message is the PPPoE message or the IPoE message, the access gateway reads access information of the user terminal from the PPPoE message or the IPoE message, encapsulates the access information into an NAS (non-access stratum) message or an EAP message, to convert a type of the access information, and then, sends the NAS message or the EAP message to a CP (control plane) function entity. The CP configures network interface information for a user terminal that is authenticated, and sends the network interface information to the access gateway. Then the access gateway sends the network interface information to the user terminal. In this way, the user terminal can access a network based on the network interface information.

As can be learned from this, according to this implementation, the access gateway can determine the type of the received message, and converts the message into a type that can be identified by another network element of a network device, so that the user terminal can access the network. In other words, in this solution, different protocol stack types can be compatible with each other, so that the user terminal is not limited when accessing the network. Therefore, full services can be provided by deploying only one core network. This not only saves a resource but also facilitates network maintenance.

In one embodiment, the access information includes at least one of a session identifier, a user terminal identifier, and a fixed network access point identifier. The session identifier is allocated by the access gateway to the user terminal. The user terminal identifier is at least one of a user terminal permanent identifier, a user terminal temporary identifier, a user terminal physical MAC (Media Access Control) address, a user terminal network access identifier NAI (network access identifier), a user terminal user name, and an agent remote identifier (Agent Remote ID). The fixed network access point identifier is at least one of a circuit identifier (circuit ID), a physical location identifier, and a logical identifier.

According to this implementation, types of access information in various forms can be identified and converted, so that this solution is more widely applicable, and functions are more complete.

In one embodiment, that the access gateway encapsulates the access information into an NAS message includes: The access gateway generates an NAS request message, and adds the access information to the NAS request message. Then, the access gateway sends a user terminal initialization message, and adds the NAS request message to the user terminal initialization message.

In addition, when the access information includes three types of messages, namely, the session identifier, the user terminal identifier, and the fixed network access point identifier, that the access gateway encapsulates the access information into an NAS message includes: The access gateway sends a user terminal initialization message, and adds at least one of the fixed network access point identifier and the session identifier in the access information to the user terminal initialization message. The access gateway generates an NAS request message, adds the user terminal identifier in the access information to the NAS request message, and adds the NAS request message to the user terminal initialization message.

The NAS request message may be a registration request message or a PDU (protocol data unit) session establishment request message.

In one embodiment, that the access gateway encapsulates the access information into an EAP message includes: The access gateway generates the EAP message, and adds the access information to the EAP message. Then, the access gateway generates a registration request message, and adds the EAP message to the registration request message. Further, the access gateway sends a user terminal initialization message, and adds the registration request message to the user terminal initialization message.

As can be learned from this, according to this implementation, the access gateway can convert the access information into different types of messages based on specific content of the access information, and the conversion can be flexibly performed, so that this solution can be more flexibly performed and is more widely applicable.

In one embodiment, after receiving the NAS message or the EAP message sent by the access gateway, the CP may first read the access information from the NAS message or the EAP message. When the access information includes at least one of the user terminal identifier and the fixed network access point identifier, the CP sends at least one of the fixed network access point identifier and the user terminal identifier to an authentication entity, to trigger the authentication entity to perform authentication based on at least one of the fixed network access point identifier and the user terminal identifier. After completing the authentication, the authentication entity sends a result of the authentication to the CP.

In one embodiment, when the access information includes the fixed network access point identifier, the CP may first send the fixed network access point identifier to an authentication entity, and receives an authentication vector that is sent by the authentication entity in response to the fixed network access point identifier. Then, the CP may generate a challenge value based on the authentication vector, adds the challenge value to a request for obtaining a user name and a password of the user terminal, and sends the request to the access gateway. After receiving the user name and the password that are sent by the user terminal, the access gateway sends the user name and the password to the CP. The CP sends the user name and the password to the authentication entity as authentication information.

As can be learned from this, according to this implementation, the fixed network access point identifier can be further used as a parameter for authentication. In addition, compared with the prior art in which an access gateway allocates a challenge value, in this implementation, the CP generates the challenge value, so that a data processing amount of the access gateway can be reduced, thereby simplifying an operation of the access gateway.

In one embodiment, after the CP receives an authentication success message sent by the authentication entity, an SMF (session management function) entity in the CP may configure at least one of an IP address and a DHCP server address for the user terminal. In addition, after configuring the IP address and/or the DHCP server address, an AMF (Core Access and Mobility Management Function) entity in the CP generates an NAS reply message, adds at least one of the IP address and the DHCP server address to the NAS reply message, and obtains the network interface information.

In one embodiment, the NAS reply message includes a location area identifier, and the location area identifier is set to a null value, a fixed network area identifier, a special location area identifier, or a circuit identifier. Specifically, the location area identifier may be set based on a requirement.

In this implementation, the CP can configure suitable network interface information for the user terminal based on a feature of the user terminal, and can further set different protocol message parameters based on different content of the network interface information, so that the functions of the CP are more complete.

In one embodiment, because the message sent by the user terminal is the PPPoE message or the IPoE message, the user terminal supports the PPPoE/IPoE protocol stack. Therefore, when the access gateway receives the network interface information sent by the CP, the access gateway may read at least one of the IP address and the DHCP server address in the network interface information, and then send at least one of the IP address and the DHCP server address to the user terminal by using an IP configuration message or an NCP (network control protocol) message in a PPPoE procedure, or send at least one of the IP address and the DHCP server address to the user terminal by using an IP configuration message in a DHCP procedure.

As can be learned from this solution, the access gateway not only can convert the message sent by the user terminal into the message type that can be identified by another function network element of the network device, but also can convert a message sent by the another function network element into a message type that can be identified by the user terminal, so that different protocol stack types can be compatible with each other in the network device.

In one embodiment, the PPPoE message may be a PADI (PPPoE active discovery indication) message, a PADR (PPPoE active discovery request) message, an LCP (link control protocol) message, or an NCP message. The IPoE message may be a DHCP discovery message or a DHCP request message.

According to a second aspect, an embodiment provides a network access apparatus. The apparatus includes a module and a unit that are configured to perform method operations in any one of the first aspect and the implementations of the first aspect. Specifically, details are not described herein again in this embodiment of the present invention.

According to a third aspect, an embodiment provides a network device. The network device includes a processor and a communications interface that are configured to perform method operations in any one of the first aspect and the implementations of the first aspect. Specifically, details are not described herein again in this embodiment of the present invention.

According to a fourth aspect, an embodiment provides a computer program product including an instruction. When the instruction is run on a computer, the computer is enabled to perform the method in the first aspect.

According to a fifth aspect, an embodiment provides a computer storage medium. The computer storage medium may store a program. When the program is executed, some or all operations in the embodiments of the network access method provided in this application may be performed.

To resolve the prior-art problem of incompatibility of fixed and mobile core networks, according to the network access method and apparatus, and the network device in this application, after receiving the message sent by the user terminal, the access gateway may determine whether the message is the PPPoE message or the IPoE message. When the message is the PPPoE message or the IPoE message, the access gateway extracts the access information of the user terminal from the message, then encapsulates the extracted access information into the NAS message or the EAP message that can be identified by the CP, and sends the NAS message or the EAP message to the CP. After receiving the NAS message or the EAP message, the CP triggers, based on the access information in the NAS message or the EAP message, the authentication entity to perform the authentication. In addition, after the authentication entity authenticates the user terminal, the CP sends the network interface information to the access gateway. Further, the access gateway sends the network interface information to the user terminal, so that the user terminal accesses the network. As can be learned from this solution, when a protocol stack supported by the network device is not compatible with a protocol stack supported by the user terminal, the access gateway in the network device can identify the message sent by the user terminal, and can convert the information in the message into the message type that can be identified by another network element in the network device, so that the user terminal is not limited by the protocol stack when accessing the network. Therefore, full services can be provided by deploying only one core network. This not only saves a resource but also facilitates network maintenance.

BRIEF DESCRIPTION OF DRAWINGS

To describe the technical solutions in this application more clearly, the following briefly describes the accompanying drawings required for describing the embodiments. Apparently, a person of ordinary skill in the art may derive other drawings from these accompanying drawings without creative efforts.

DESCRIPTION OF EMBODIMENTS

The following describes this application with reference to the accompanying drawings.

It should be noted that, because a mobile core network and a fixed core network support different protocol stacks, and based on features of the different protocol stacks, a function network element of the mobile core network is different from that of the fixed core network, and the function network elements are differently disposed. Therefore, a function architecture of the mobile core network is different from that of the fixed core network, further leading to incompatibility of the mobile core network and the fixed core network. In view of this, to resolve the problem, technical solutions of this application are provided.

Figure 1:
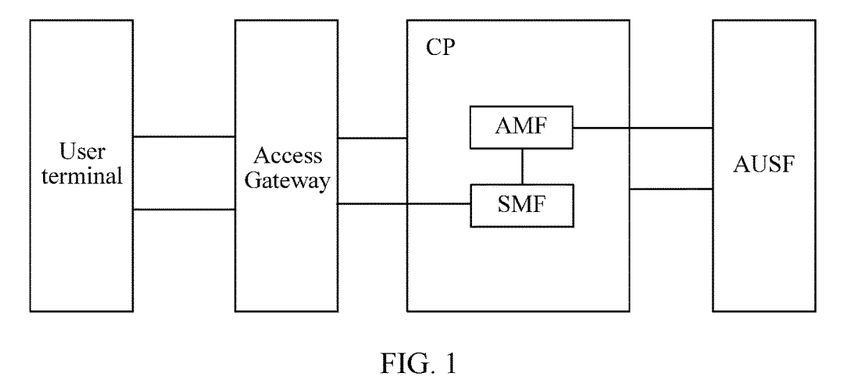
FIG. 1 is a diagram of a network system architecture according to an embodiment of this application.

FIG. 1 is a diagram of a network system architecture according to an embodiment of this application. The network system architecture includes function network elements such as an access gateway, a CP, and an AUSF (Authentication Server Function, e.g., an authentication entity). The access gateway may be an ngPDG (next generation access gateway) or an AGF (Access Gateway Function), support a user terminal in sending a message to a network by using a non-3GPP interworking function (N3IWF), and send the message to the CP after receiving the message sent by the user terminal. The CP includes an AMF and an SMF, where the AMF is responsible for a registration procedure during access by the user terminal and management of a location of the user terminal, and the SMF is responsible for establishing a corresponding session connection when initiating a service to the user terminal. In addition, the CP is further responsible for sending authentication information to the AUSF and triggering the AUSF to perform authentication, and the AUSF is mainly configured to store user subscription data, user authentication, and the like.

Figure 2:
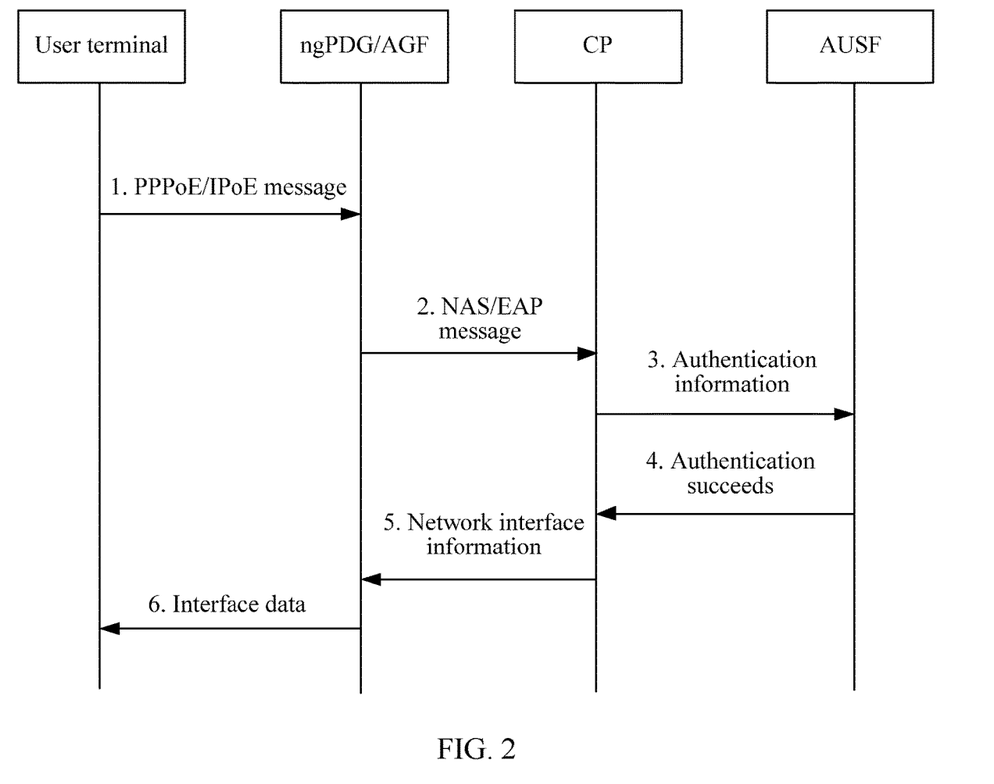
FIG. 2 is a schematic diagram of information exchange of a network access method according to an embodiment of this application.

Referring to FIG. 2, based on the foregoing network system architecture and function network elements, FIG. 2 is a schematic diagram of information exchange of a network access method according to an embodiment of this application. In the network access method provided in an embodiment of this application, two protocol stacks can be compatible with each other, so that the user terminal is not limited by the protocol stack when accessing the network. Specifically, the method includes the following content.

The method of this application according to one embodiment is applied to a network device, and the network device includes an access gateway and a CP. Operation 1: The access gateway receives a PPPoE/IPoE message sent by the user terminal, and obtains access information that is of the user terminal and that corresponds to the PPPoE/IPoE message. Operation 2: The access gateway encapsulates the access information into an NAS/EAP message, and sends the NAS/EAP message to the CP. Operation 3: The CP triggers, based on the access information, the AUSF to perform authentication. Operation 4: The CP receives an authentication success message sent by the AUSF. Operation 5: The CP configures network interface information for the user terminal, and sends the network interface information to the access gateway. Operation 6: The access gateway sends interface data in the network interface information to the user terminal. Operation 7: The user terminal accesses a network based on the interface data.

Specifically, a message sent by the user terminal to the network device may be a PPPoE message or an IPoE message (for ease of description, the PPPoE message or the IPoE message may be described as a PPPoE/IPoE message in this application), or may be an NAS message or an EAP message (for ease of description, the NAS message or the EAP message may be described as an NAS/EAP message in this application), and corresponding to messages of different protocol types, an access process corresponding to the network device according to an embodiment in this application varies. Therefore, when the access gateway receives the message, the access gateway may first determine a type of the message by reading a type identifier in a data packet header of the message, to determine whether the message is a PPPoE/IPoE message or an NAS/EAP message. If the message is an NAS/EAP message, all other function network elements of the network device can identify the message, the access gateway may directly send the message to the CP, and the CP performs a subsequent access process. Specifically, when the message sent by the user terminal is an NAS/EAP message, a processing process of each function network element of the network device can be a process known by a person skilled in the art. Details are not described herein again in this application. If the message sent by the user terminal is a PPPoE/IPoE message, another function network element of the network device cannot identify the message. Consequently, an operation of accessing the network by the user terminal cannot be further performed. Therefore, the access gateway further performs operation 1 and a subsequent operation, so that the user terminal can access the network.

It should be noted that, in this embodiment, the access information may include at least one of a session identifier, a user terminal identifier, and a fixed network access point identifier. The session identifier is allocated by the access gateway to the user terminal. For example, in an optional example of this application, the access gateway pre-allocates a unique session identifier Session-ID to the user terminal. The user terminal identifier is at least one of a user terminal permanent identifier or a user terminal temporary identifier, a user terminal MAC address or a user terminal NAI, a user terminal user name, and an agent remote identifier. The fixed network access point identifier is at least one of a circuit identifier, a physical location identifier, and a logical identifier. Based on this, in this embodiment, that the access gateway obtains access information may include: extracting the session identifier of the user terminal included in the PPPoE/IPoE message and/or the user terminal identifier included in the PPPoE/IPoE message. Certainly, based on obtaining the session identifier and/or the user terminal identifier of the user terminal, the following may be further included: identifying a source of the PPPoE/IPoE message, and determining the fixed network access point identifier of the user terminal.

Based on a plurality of different forms that are included for content of the access information, a process in which the access gateway encapsulates the access information into an NAS/EAP message may include several implementations. In addition, a process in which the CP triggers, based on the access information, the AUSF to perform authentication may also include a plurality of different implementations. The following respectively describes two execution processes, namely, a process of obtaining the NAS/EAP message through encapsulation and a process of performing authentication by the AUSF, corresponding to access information in different content forms.

Specifically, in an embodiment, the access gateway encapsulating the access information into an NAS message includes: The access gateway generates an NAS request message, and adds the access information to the NAS request message. Then, the access gateway sends a user terminal initialization message, and adds the NAS request message to the user terminal initialization message.

It should be noted that, in this solution, the access gateway and the CP performs data communication through an N2 interface. Therefore, after generating the user terminal initialization message, the access gateway also sends the user terminal initialization message to the CP through the N2 interface. Therefore, a process in which the access gateway generates and sends the user terminal initialization message may be described as follows: The access gateway sends the user terminal initialization message, and may name the user terminal initialization message as the N2 message.

In another embodiment, when the access information includes three types of messages, namely, the session identifier, the user terminal identifier, and the fixed network access point identifier, that the access gateway encapsulates the access information into an NAS message includes: The access gateway sends an N2 message, and adds at least one of the fixed network access point identifier and the session identifier in the access information to the N2 message. The access gateway generates an NAS request message, adds the user terminal identifier in the access information to the NAS request message, and adds the NAS request message to the N2 message.

The NAS request message may be a registration request message or a PDU session establishment request message.

In another embodiment, the access gateway encapsulating the access information into an EAP message includes: The access gateway generates the EAP message, and adds the access information to the EAP message. Then, the access gateway generates a registration request message, and adds the EAP message to the registration request message. Further, the access gateway sends the N2 message, and adds the registration request message to the N2 message.

For example, in an embodiment, the access information is a MAC address of a user. The ngPDG may generate an NAI based on the MAC address. Then, the ngPDG adds the NAI to the EAP message, adds the EAP message to the registration request message, and further adds the registration request message to the N2 message.

In addition, it should be noted that, in this solution, the PPPoE message may be a PADI message, a PADR message, an LCP message, or an NCP message. The IPoE message may be a DHCP discovery message or a DHCP request message. The foregoing execution process of this solution is applicable to PPPoE messages or IPoE messages in various forms. For details, refer to the foregoing descriptions, and each specific form of message is not described one by one in this solution.

As can be learned from this, in the technical solutions according to an embodiment of this application, the access gateway can determine, based on a message type identifier in a data packet header of the message, a protocol type of the message sent by the user terminal. In addition, when another function network element of the network device does not support a protocol stack of the message, the access gateway can still convert a type of the message, so that the network device can perform an access operation based on messages of different protocol types, so that the user terminal is not limited by the protocol stack when accessing the network.

Based on the foregoing descriptions, after receiving the NAS/EAP message sent by the access gateway, the CP may first read the access information from the NAS/EAP message. When the access information includes at least one of the user terminal identifier and the fixed network access point identifier, the CP sends at least one of the fixed network access point identifier and the user terminal identifier to an AUSF, to trigger the AUSF to perform authentication based on at least one of the fixed network access point identifier and the user terminal identifier. After completing the authentication, the AUSF sends a result of the authentication to the CP.

Specifically, in an embodiment, when content of the access information is only the user terminal identifier, for example, Session-ID and/or the NAI, the CP may send, to the access gateway, a request for obtaining a user name and a password of the user terminal and the challenge value. The access gateway may obtain the user name and the password of the user terminal from the user terminal in response to the request, and sends, to the CP, the user name, the password, and the challenge value that is generated in advance by the access gateway. The CP may use the user name, the password, and the challenge value to the AUSF as authentication information.

In another embodiment, when content of the access information is Session-ID and/or the NAI and the fixed network access point identifier, the CP may first send the fixed network access point identifier to an AUSF, and receives an authentication vector that is sent by the AUSF in response to the fixed network access point identifier. Then, the CP may generate a challenge value based on the authentication vector, adds the challenge value to a request for obtaining a user name and a password of the user terminal, and sends the request to the access gateway. After receiving the user name and the password that are sent by the user terminal, the access gateway sends the user name and the password to the CP. The CP sends the user name and the password to the AUSF as authentication information.

It should be noted that, in this embodiment, although the challenge value is generated by the CP, the challenge value may be a parameter in the authentication vector. In this case, after generating the authentication vector in response to the fixed network access point identifier, the AUSF can directly obtain the challenge value from the authentication vector. In one embodiment, because the AUSF already learns of the challenge value, the CP does not need to carry the challenge value when sending the user name and the password to the AUSF. Certainly, in another embodiment, if the challenge value is not directly obtained from the authentication vector, but is generated by the CP, the CP should also send the challenge value when sending the user name and the password to the AUSF. Specifically, details are not described herein in this embodiment of the present invention.

In another embodiment, when content of the access information includes the NAI and the fixed network access point identifier, the CP may directly send the NAI and the fixed network access point identifier to the AUSF as authentication information.

It can be learned from the prior art that, in a fixed core network function architecture, a function of a BNG includes performing information exchange with the user terminal and authentication control. Consequently, the fixed core network function architecture cannot be compatible with a function architecture of the network of this application. It can be learned from the foregoing descriptions that, in an embodiment of this application, the access gateway performs information exchange with the user terminal, and the CP performs authentication control, so that the fixed core network function architecture and the function architecture of the network device of this application can be compatible with each other, so that functions of the network device of this application can be improved, and the network device can access the user terminal supporting different protocol stacks.

Corresponding to the foregoing descriptions, when the CP receives an authentication success message sent by the AUSF, an SMF in the CP may configure at least one of an IP address and a DHCP server address for a corresponding user terminal. In one embodiment, after configuring the IP address and/or the DHCP server address, a mobile function entity AMF in the CP generates an NAS reply message, adds at least one of the IP address and the DHCP server address to the NAS reply message, and obtains network interface information.

It should be noted that, in one embodiment, the NAS reply message includes a location area identifier, and the location area identifier is a location area identifier allocated by the CP to the user terminal. In this solution, the user terminal is a fixed network terminal, and the CP does not need to allocate a location area identifier to the user terminal. Therefore, in this embodiment, the location area identifier may be set to a null value. Alternatively, a fixed network area identifier, a special location area identifier, or a circuit identifier may be allocated to the user terminal, and specifically, setting may be performed based on a preset requirement. Details are not described herein again in this application.

It should be noted that, because the message sent by the user terminal is the PPPoE/IPoE message, the user terminal supports the PPPoE/IPoE protocol stack. Therefore, when the access gateway receives the network interface information sent by the CP, the access gateway may read at least one of the IP address and the DHCP server address in the network interface information, and then send at least one of the IP address and the DHCP server address to the user terminal by using an IP configuration message or an NCP message in a PPPoE procedure, or send at least one of the IP address and the DHCP server address to the user terminal by using an IP configuration message in a DHCP procedure.

In another embodiment, the access gateway can identify that the user terminal is a fixed network terminal. Therefore, the access gateway may directly perform authentication on the user terminal, and after the authentication succeeds, encapsulate authentication success information and the access information of the user terminal into the NAS/EAP message, and send the NAS/EAP message to the CP. The CP may directly configure the network interface information for the user terminal, and send the network interface information to the access gateway. In this embodiment, for details of an execution process other than an authentication process, refer to the foregoing descriptions. Details are not described herein again in this application.

In conclusion, according to the network access method according to one embodiment in this application, different protocol stack types can be compatible with each other, and the function of the fixed core network can be compatible by decentralizing functions of function network elements of the fixed core network, so that the user terminal is not limited when accessing the network. Therefore, full services can be provided by deploying only one core network. This not only saves a resource but also facilitates network maintenance.

This solution is elaborated from a perspective of brief description in the foregoing embodiments. To make a person skilled in the art know this solution more clearly and in more detail, the following elaborates this solution with reference to examples respectively corresponding to the PPPoE message and the IPoE message that are sent by the user terminal.

Figure 3:
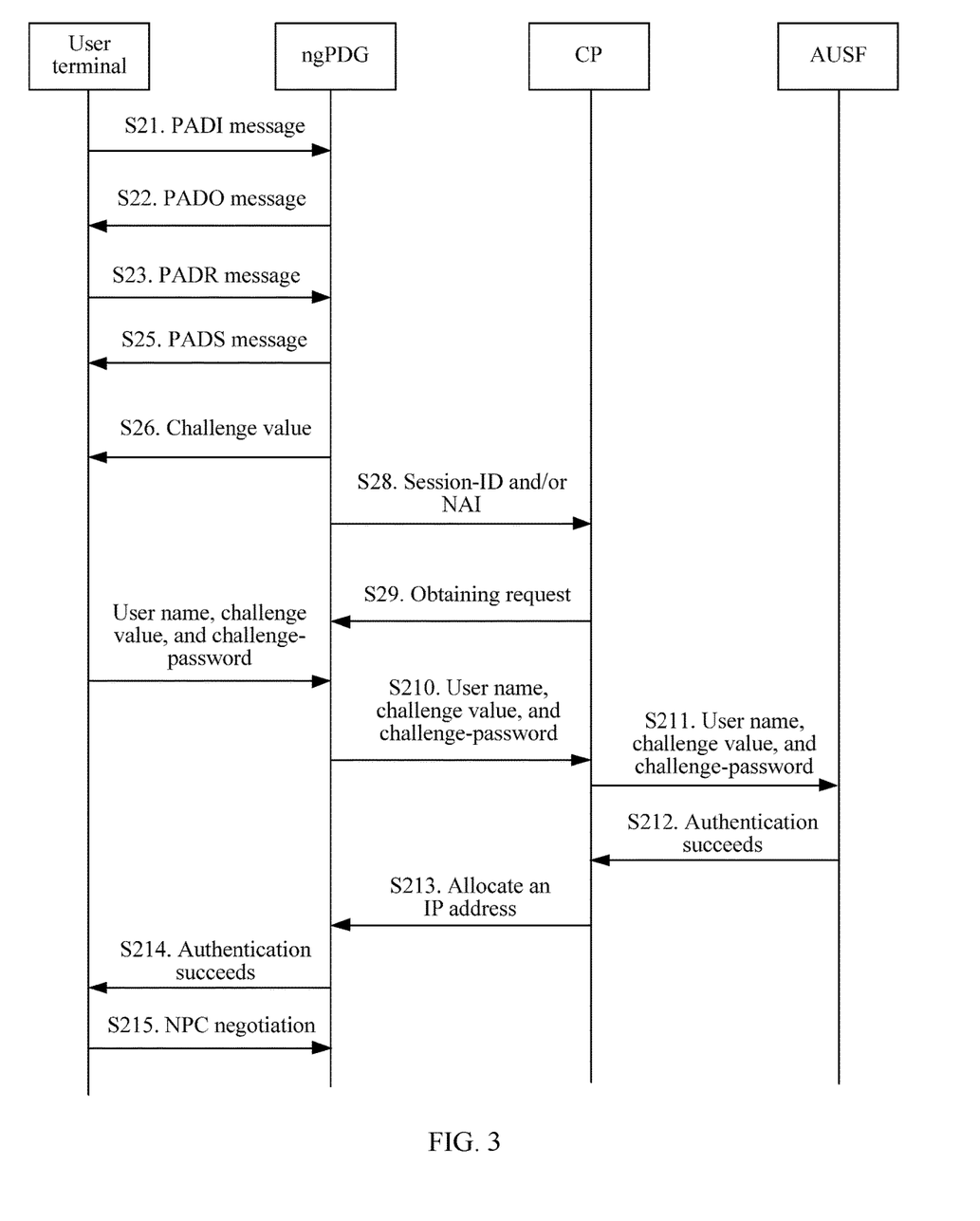
FIG. 3 is a schematic diagram of information exchange of a first implementation of a network access method according to an embodiment of this application.

FIG. 3 is a schematic diagram of information exchange of a first implementation of a network access method according to an embodiment of this application. In the embodiment shown in FIG. 3, a user terminal initiates a PPPoE access procedure, and an access gateway is an ngPDG. Specifically: Operation S21: The user terminal sends a PADI message to the ngPDG. Operation S22: The ngPDG sends a PPPoE active discovery offer PADO message to the user terminal, to respond to the request of the user terminal. Operation S23: The user terminal sends a PPPoE active discovery request PADR message to the ngPDG after selecting the PADO message of the ngPDG. Operation S24: Allocate a unique PPPoE session identifier Session-ID to the user terminal after receiving the PADR message sent by the user terminal. Operation S25. The ngPDG sends an active discovery session-confirmation PADS message to the user terminal, where the PADS message includes Session-ID. Operation S26: The ngPDG generates a challenge value, and sends the challenge value to the user terminal. Operation S27: The user terminal performs an MD5 algorithm on the challenge value and an initial password, to generate a hashed password challenge-password.

It should be noted that, the foregoing operations are a process in which the user terminal and the ngPDG performs a PPPoE session with each other. An information protocol in the process supports a PPPoE protocol stack. Because the process is a process known by a person skilled in the art, details are not described again in this application.

Based on operation S21, the ngPDG already can determine, by using a type identifier of a data packet header of the PADI message, that the message sent by the user terminal is a PPPoE message. Therefore: Operation S28: The ngPDG reads Session-ID of the user terminal, set an N2 ID to Session-ID, adds Session-ID to an N2 message, and sends the N2 message to a CP.

Certainly, the foregoing description is merely an implementation and should not be construed as limiting. In this embodiment, alternatively, Session-ID may be added to an NAS message. Alternatively, the ngPDG reads a MAC address of the user terminal, and generates an NAI=MAC@domain name, where the domain identifier domain name may be fixed network operator PLMN information. Then, the NAI is added to an EAP-Response message. Certainly, in this embodiment of this application, the ngPDG may send Session-ID or an NAS/EAP message that corresponds to the NAI to the CP.

In addition, it should be noted that, in this embodiment of this application, Session-ID or the MAC address functions as a device identifier of the user terminal, the ngPDG sets, in the NAS message, a request type to be initial attachment, and sets a PDN type to an IPv4 address and an IPv6 address, or based on a configuration, sets a PDN type to be an only-IPv4 or only-IPv6 address.

Operation S29: The CP reads and stores Session-ID and/or the MAC address, and sends, to the ngPDG, the N2 message carrying an EAP-Request message. It should be noted that, the EAP-Request message may include information about a request for obtaining a user name of the user terminal and challenge-password. Operation S210: In response to the request information, the ngPDG obtains the user name of the user terminal and challenge-password from the user terminal, adds the user name, the challenge value, and challenge-password to an EAP message, and sends the EAP message to the CP.

Information such as the user name of the user terminal and challenge-password, has a relatively high security level. Therefore, in this embodiment, before the ngPDG sends the user name and challenge-password to the CP, the CP may establish a secure channel to the ngPDG, so that the ngPDG sends the user name and challenge-password to the CP through the secure channel. The secure channel may be but is not limited to a TTLS secure channel.

Operation S211: The CP extracts the user name, challenge-password, and the challenge value from the EAP message, and sends the user name, challenge-password, and the challenge value to an AUSF, to trigger the AUSF to perform authentication.

Specifically, the AUSF may search for subscription data based on the user name, perform a hash operation on a password corresponding to the user name in the subscription data and the received challenge value, to obtain an operation result, then compares the operation result with received challenge-password, and if the operation result is the same as received challenge-password, user authentication succeeds; otherwise, user authentication fails.

Operation S212: After the authentication performed by the AUSF succeeds, the AUSF sends authentication success notification information to the CP, where the notification information includes user subscription data. Operation S213: The CP allocates an IP address to the user terminal, adds the allocated IP address to the N2 message, and sends the N2 message to the ngPDG. In this embodiment, the IP address may be added to the NAS message. Specifically, a location area identifier in the NAS message may be set to a null value. Operation S214: The ngPDG sends the authentication success notification information to the user terminal. Operation S215: The user terminal initiates NCP negotiation to the ngPDG, obtains the IP address, and accesses a network based on the IP address.

It can be learned from the description of this embodiment, in this solution, information about interaction between the ngPDG and the user terminal supports the PPPoE protocol stack, and information about interaction between the ngPDG and the CP supports the NAS/EAP message, in other words, the ngPDG can identify and bidirectionally convert the PPPoE protocol stack and an NAS/EAP protocol stack message, so that the two protocol stacks can be compatible with each other in a network device.

Certainly, the embodiment shown in FIG. 3 is an implementation. The technical solutions of this application are not limited thereto.

Figure 4:
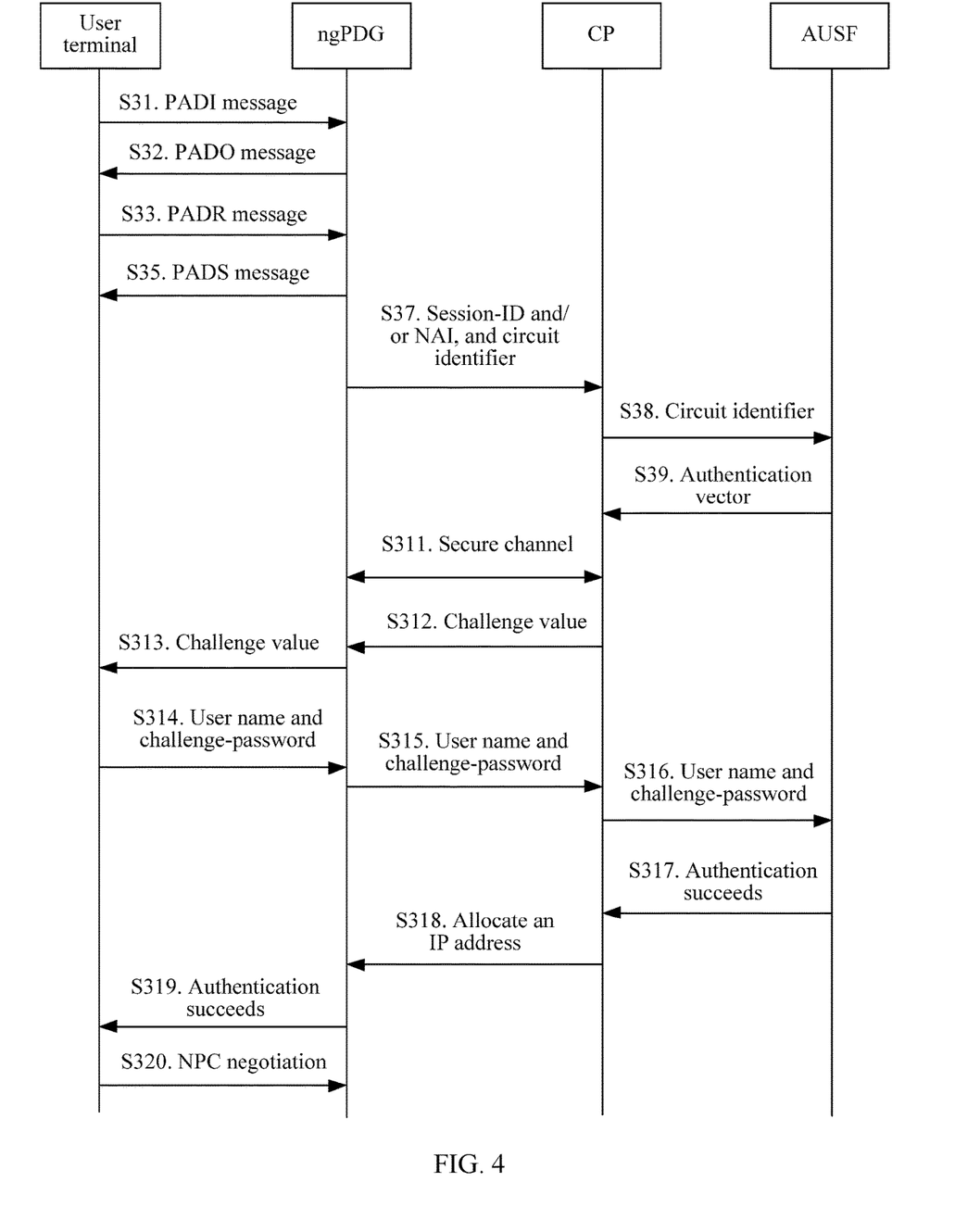
FIG. 4 is a schematic diagram of information exchange of a second implementation of a network access method according to an embodiment of this application.

FIG. 4 is a schematic diagram of information exchange of a second implementation of a network access method according to an embodiment of this application. In the embodiment shown in FIG. 4, a user terminal also initiates a PPPoE access procedure, specifically, including the following procedures.

Operation S31 to operation S35 are a process in which the user terminal and an ngPDG perform a PPPoE session, and are the same as operation S21 to operation S25 in the embodiment shown in FIG. 3. For details, refer to the descriptions of the embodiment shown FIG. 3. Details are not described herein again in this application.

Operation S36: The ngPDG reads Session-ID or a MAC address of the user terminal, identifies a PPPoE connection resource, and determines a fixed network access point identifier. In this embodiment, the fixed network access point identifier is a circuit identifier. Operation S37: The ngPDG encapsulates Session-ID or the MAC address, and the circuit identifier into an NAS/EAP message, and sends the NAS/EAP message to the CP. Operation S38: The CP reads and stores Session-ID or the MAC address, and the circuit identifier, and sends the circuit identifier to an AUSF. Operation S39: The AUSF obtains, based on the circuit identifier, an authentication vector corresponding to the circuit, and sends the authentication vector to the CP. Operation S310: The CP generates a challenge value based on the authentication vector. Operation S311: The CP establishes a secure channel to the ngPDG. Operation S312: The CP sends an EAP-Request message to the ngPDG through the secure channel. In this embodiment, the EAP-Request message includes the challenge value. Operation S313: The ngPDG sends the challenge value and a request for obtaining a user name and challenge-password to the user terminal.

An operation process of operation S314 to operation S320 is similar to a process of operation S210 to operation S215 in the embodiment shown in FIG. 3. Details are not described herein in this embodiment.

It should be noted that, in this embodiment, the challenge value may be a random number in the authentication vector. Therefore, in operation S39, after generating the authentication vector, the AUSF may directly read the random number in the authentication vector as the challenge value. Therefore, in this embodiment, the AUSF already learns of the challenge value. Further, a difference between this embodiment and the embodiment shown in FIG. 3 is as follows: When the CP sends the user name and challenge-password to the AUSF, the challenge value is not carried. For details, refer to the description of operation S316 in FIG. 4. Details are not described herein again in this embodiment.

In addition, in this embodiment, the challenge value is generated by the CP. Therefore, the ngPDG sends only the user name and challenge-password to the CP. In addition, when the CP adds an allocated IP address to an NAS message, the CP may set a location area identifier in the NAS message to a null value or a circuit identifier.

Based on the embodiment shown in FIG. 3, the ngPDG is configured to perform the PPPoE session with the user terminal, and further needs to perform conversion between the two protocols, leading to a relatively large data processing amount of the ngPDG and relatively complex operations. Based on this, in this embodiment, the CP generates the challenge value, so that the data processing amount of the ngPDG can be reduced, and operations of the ngPDG can be simplified.

The foregoing two embodiments are descriptions of this application by using the PPPoE protocol stack as an example. To enable a person skilled in the art to more completely understand this solution, the following describes an operation process of this application by using an IPoE protocol stack as an example.

Figure 5:
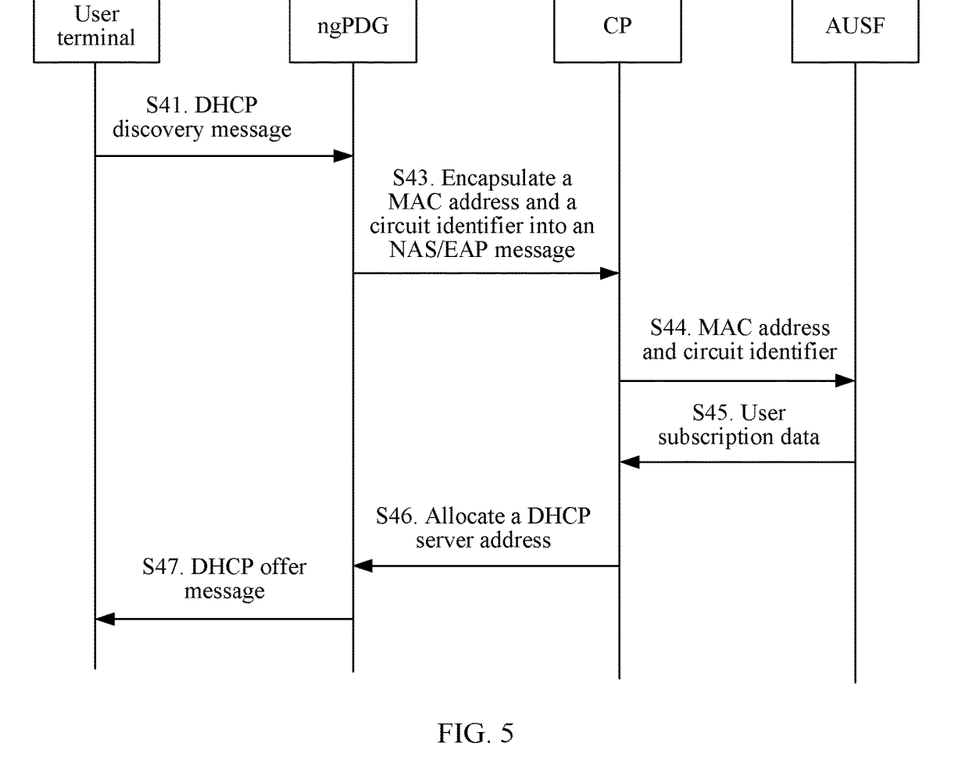
FIG. 5 is a schematic diagram of information exchange of a third implementation of a network access method according to an embodiment of this application.

FIG. 5 is a schematic diagram of information exchange of a third implementation of a network access method according to an embodiment of this application. In this embodiment, a user terminal initiates an IPoE access procedure. Specifically: Operation S41: The user terminal establishes a layer-2 connection to an ngPDG, and sends a DHCP discovery message to the ngPDG. Operation S42: The ngPDG obtains a MAC address of the user terminal from the DHCP discovery message, identifies an IPOE connection source, and determines a fixed network access point identifier of the user terminal. In this implementation, the fixed network access point identifier may be a circuit identifier. Operation S43: The ngPDG encapsulates the MAC address and the circuit identifier into an NAS/EAP message, and sends the NAS/EAP message to a CP.

It should be noted that, in this embodiment, the ngPDG may also send pre-allocated Session-ID to the CP. In addition, the user terminal supporting an IPoE protocol stack automatically obtains an IP address based on a DHCP server. Therefore, a time at which the IP address is obtained is delayed. Therefore, in this embodiment, during generation of an NAS message, an IP address delayed obtaining indication is set.

Operation S44: The CP extracts and stores the MAC address and the circuit identifier, and sends the MAC address and the circuit identifier to the AUSF, to trigger the AUSF to perform authentication.

In this embodiment, the AUSF searches for user subscription data based on the circuit identifier, and performs matching on the received MAC address and a MAC address in the subscription data. If the matching succeeds, the authentication succeeds; otherwise, the authentication fails.

After the authentication succeeds: Operation S45: The AUSF sends the user subscription data to the CP. Operation S46: The CP allocates a DHCP server address to the user terminal, and sends the DHCP server address to the ngPDG by using an NAS message or an N2 message. Operation S47: The ngPDG sends a DHCP offer message to the user terminal, where the DHCP offer message carries the DHCP server address allocated by the CP.

It should be noted that, in this embodiment, the CP may alternatively not allocate a DHCP server address to the user terminal. In this case, in this implementation scenario, the CP sends only authentication success notification information to the ngPDG, and the ngPDG allocates a DHCP server address to the user terminal.

Operation S48: The user terminal accesses the DHCP server address, obtains an IP address from a DHCP server, and accesses a network based on the IP address.

It should be noted that, in this embodiment, when performing operation S46, the CP may alternatively allocate an IP address to the user terminal, and sends the IP address and the DHCP server address together to the user terminal in a subsequent procedure, so that the user terminal accesses a network based on the IP address allocated by the CP, and when the user terminal needs to obtain another IP address in a subsequent network operation process, the user terminal may obtain the another IP address by accessing the DHCP server address.

In addition, in one embodiment, the CP may also generate a challenge value, and send the challenge value to the ngPDG by using the NAS message, so that the user terminal generates challenge-password based on the challenge value. Specifically, for details, refer to a process of performing operation S38 to operation S312 in the embodiment shown in FIG. 4. Details are not described herein again in this embodiment.

Certainly, it can be learned that, the foregoing descriptions are merely several optional implementations of this application, and constitute no limitation on the technical solutions of this application. In the foregoing implementations, the access gateway may alternatively be replaced with the AGF, and the access information may alternatively be replaced with another suitable message.

Specifically, details are not described herein again in this application.

In conclusion, according to the network access method provided in one embodiment of this application, when a protocol stack supported by the network device is not compatible with a protocol stack supported by the user terminal, the ngPDG in the network device can identify the message sent by the user terminal, and can convert the information in the message into the message type that can be identified by another network element in the network device, so that the user terminal is not limited by the protocol stack when accessing the network. Therefore, full services can be provided by deploying only one core network. This not only saves a resource but also facilitates network maintenance.

Figure 6:
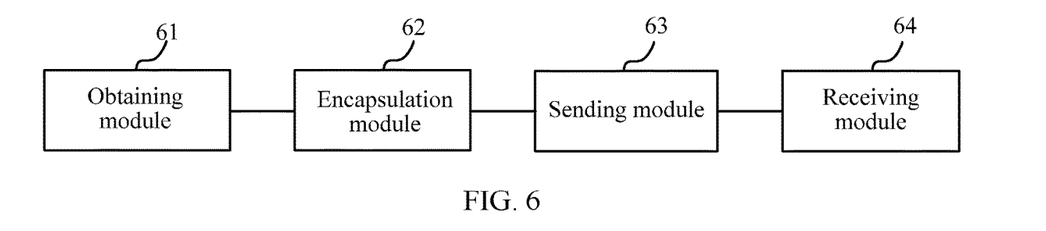
FIG. 6 is a schematic structural diagram of a network access apparatus according to an embodiment of this application.

Corresponding to the foregoing network access method, an embodiment of this application further provides a network access apparatus. FIG. 6 is a schematic structural diagram of a network access apparatus according to an embodiment of this application. The apparatus can be configured to perform the network access method shown in FIG. 2 to FIG. 5. The apparatus includes an obtaining module 61, an encapsulation module 62, a sending module 63, and a receiving module 64. The obtaining module 61 is configured to: when a point-to-point connection protocol PPPoE message or a dynamic host configuration protocol IPoE message sent by a user terminal is received, obtain access information of the user terminal included in the PPPoE message or the IPoE message. The encapsulation module 62 is configured to encapsulate the access information into a non-access stratum NAS message or an extensible authentication protocol EAP message. The sending module 63 is configured to send the NAS message or the EAP message to a control plane function entity CP. The receiving module 64 is configured to: receive network interface information sent by the CP, and send the network interface information to the user terminal, so that the user terminal accesses a network.

In a specific embodiment, the encapsulation module 62 includes a generation unit and a sending unit. The generation unit is configured to: generate an NAS request message, and add the access information to the NAS request message, where the NAS request message is a registration request message or a protocol data unit PDU session establishment request message. The sending unit is configured to: send a user terminal initialization message, and add the NAS request message to the user terminal initialization message. In addition, in this embodiment, the sending unit is further configured to: send a user terminal initialization message, and add at least one of a fixed network access point identifier and a session identifier in the access information to the user terminal initialization message; and the generation unit is further configured to: generate an NAS request message, add a user terminal identifier in the access information to the NAS request message, and add the NAS request message to the user terminal initialization message.

In another embodiment, the generation unit is further configured to: generate the EAP message, add the access information to the EAP message, generate a registration request message, and add the EAP message to the registration request message; and the sending unit is further configured to: send a user terminal initialization message, and add the registration request to the user terminal initialization message.

In addition, the apparatus further includes a configuration module. In this embodiment, the sending module 63 is further configured to: when the access information includes at least one of a user terminal identifier and a fixed network access point identifier, send at least one of the fixed network access point identifier and the user terminal identifier to an authentication entity. The receiving module 64 is further configured to receive a result of authentication performed by the authentication entity based on at least one of the fixed network access point identifier and the user terminal identifier. The configuration module is configured to: when the result of the authentication is that the authentication succeeds, configure the network interface information for the user terminal.

In one embodiment, the receiving module 64 is specifically configured to: after the sending module 63 sends the access information to the authentication entity, receive an authentication vector sent by the authentication entity based on the fixed network access point identifier. The sending module 63 is further configured to: generate a challenge value based on the authentication vector, send the challenge value to the access gateway, and send, to the user terminal, a request for obtaining a user name and a password, where the request includes the challenge value, and the password is obtained by the user terminal by performing a hash operation on the challenge value and an initial password. The receiving module 64 is further configured to receive the user name and the password. The sending module 63 is further configured to: send the user name and the password to the CP, and send the user name and the password sent to the authentication entity, so that the authentication entity performs authentication based on the user name and the password.

In one embodiment, the configuration module is specifically configured to: allocate at least one of an interne protocol address IP address and a host configuration protocol DHCP server address to the user terminal, generate an NAS reply message, add at least one of the IP address and the DHCP server to the NAS reply message, and obtain the network interface information.

In another embodiment, the sending module 63 is specifically configured to: read at least one of the IP address and the DHCP server address in the network interface information, and send at least one of the IP address and the DHCP server address to the user terminal by using an IP configuration message or a network control protocol NCP message.

Figure 7:
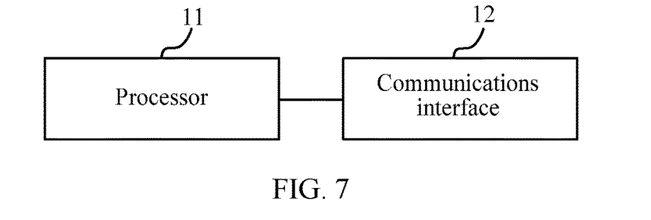
FIG. 7 is a schematic structural diagram of a network device according to an embodiment of this application.

In addition, an embodiment of this application further provides a network device. FIG. 7 is a schematic structural diagram of a network device according to an embodiment of this application. The device is configured to perform the network access method shown in FIG. 2 to FIG. 5. The device includes a processor 11 and a communications interface 12. The communications interface 12 is configured to receive a PPPoE message or an IPoE message sent by a user terminal. The processor 11 is configured to: obtain access information of the user terminal included in the PPPoE message or the IPoE message, and encapsulate the access information into an NAS message or an EAP message. The communications interface 12 is configured to send network interface information to the user terminal, so that the user terminal accesses a network.

The processor 11 encapsulating the access information into an NAS message may be performed as follows: The processor 11 generates an NAS request message, adds the access information to the NAS request message, generates a user terminal initialization message, and adds the NAS request message to the user terminal initialization message; or generates a user terminal initialization message, adds at least one of a fixed network access point identifier and a session identifier in the access information to the user terminal initialization message, generates an NAS request message, adds a user terminal identifier in the access information to the NAS request message, and adds the NAS request message to the user terminal initialization message. The NAS request message is a registration request message or a protocol data unit PDU session establishment request message.

The processor 11 encapsulating the access information into the EAP message may be performed as follows: The processor 11 generates the EAP message, adds the access information to the EAP message, then, generates a registration request message, adds the EAP message to the registration request message, then, generates a user terminal initialization message, and adds the registration request to the user terminal initialization message.

In one embodiment, after encapsulating the access information into the non-access stratum NAS message or the extensible authentication protocol EAP message, the processor 11 is further configured to: perform authentication based on at least one of a user terminal identifier and a fixed network access point identifier in the access information, obtain an authentication result, and when the authentication result is that the authentication succeeds, configure the network interface information for the user terminal. The performing authentication based on a fixed network access point identifier in the access information may be performed as follows: The processor 11 searches for an authentication vector based on the fixed network access point identifier, and generates a challenge value based on the authentication vector. The communications interface 12 sends the challenge value to the user terminal, and receives a user name and a password that are sent by the user terminal. The processor 11 performs authentication based on the user name, the password, and the challenge value, and obtains an authentication result.

In another embodiment, that the processor 11 configures the network interface information for the user terminal is performed as: allocating at least one of an internet protocol address IP address and a host configuration protocol DHCP server address to the user terminal by using an SMF, generates an NAS reply message by using an AMF, adding at least one of the IP address and the DHCP server to the NAS reply message, and obtaining the network interface information.

That the communications interface 12 sends the network interface information to the user terminal is specifically performed as: the communications interface sends at least one of the IP address and the DHCP server address to the user terminal by using an IP configuration message or a network control protocol NCP message.

In addition, a person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to information exchange diagrams of the method, the apparatus (device), and the computer program product according to the embodiments of the present invention. It should be understood that each procedure in an information exchange diagram and a combination of procedures in an information exchange diagram can be implemented by using a computer program instruction. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts.

These computer program instructions may be alternatively stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts.

These computer program instructions may further be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts.

Correspondingly, an embodiment of the present invention further provides a computer storage medium. The computer storage medium may store a program. When the program is executed, some or all operations in the embodiments of the network access method shown in FIG. 1 to FIG. 5 may be performed. Specifically, details are not described herein in this embodiment of the present invention.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A network access method, comprising:
receiving, by an access gateway, a point-to-point Over Ethernet (PPPoE) message from a user terminal;
obtaining, by the access gateway, access information of the user terminal comprised in the PPPoE message;
encapsulating, by the access gateway, the access information into a registration request message;
sending, by the access gateway, the registration request message to a mobility function entity; and
receiving, by the access gateway, network interface information from the mobility function entity, and sending the network interface information to the user terminal, wherein the network interface information is for accessing a network.

2. The network access method according to claim 1, wherein
the access information comprises a circuit identifier.

3. The network access method according to claim 1, wherein the encapsulating the access information into the registration request message comprises:
generating the registration request message, and adding the access information to the registration request message; and
wherein sending the registration request message to the mobility function entity comprises:
sending a user terminal initialization message, wherein the user terminal initialization message carries the registration request message.

4. The network access method according to claim 2, further comprising:
sending, by the mobility function entity, the circuit identifier to an authentication entity;
receiving, by the mobility function entity, a result of an authentication performed by the authentication entity based on the circuit identifier; and
when the result of the authentication is that the authentication succeeds, configuring, by an session management function entity, the network interface information for the user terminal.

5. The network access method according to claim 4, further comprising:
generating, by the mobility function entity, an NAS reply message, adding an internet protocol (IP) address to the NAS reply message.

6. The network access method according to claim 5, wherein the network interface information is the IP address, wherein the network interface information sent by the mobility function entity, and sending the network interface information to the user terminal comprises:
  reading the IP address; and
  sending the IP address to the user terminal by using an IP configuration message or a network control protocol (NCP) message.

7. The network access method according to claim 1, wherein
  the PPPoE message comprises a PPPoE active discovery indication (PADI) message.

8. A network access apparatus, comprising at least one processor; and
  a memory storing computer-executable instructions, wherein the computer-executable instructions, when executed by the at least one processor, instruct the at least one processor to: receive a point-to-point Over Ethernet (PPPoE) message from a user terminal;
  obtain access information of the user terminal comprised in the PPPoE message;
  encapsulate the access information into a registration request message;
  send the registration request message to a mobility function entity; and
  receive network interface information from the mobility function entity, and send the network interface information to the user terminal, wherein the network interface information is for accessing a network.

9. The network access apparatus according to claim 8, wherein the computer-executable instructions instruct the at least one processor to:
  generate the registration request message, and adding the access information to the registration request message; and
  wherein to send the registration request message to the mobility function entity comprise:
  send a user terminal initialization message, wherein the user terminal initialization message carries the registration request message.

10. A network access system, comprising: an access gateway and a mobility function entity, wherein
  the access gateway is configured to:
    receive a point-to-point Over Ethernet (PPPoE) message from a user terminal;
    obtain access information of the user terminal comprised in the PPPoE message;
    encapsulate the access information into a registration request message;
    send the registration request message to the mobility function entity;
  the mobility function entity is configured to:
    receive the registration request message; and
    send network interface information to the access gateway; and wherein the access gateway is further configured to:
    receive the network interface information, and send the network interface information to the user terminal, wherein the network interface information is for accessing a network.

11. The network access system according to claim 10, wherein the access gateway is further configured to:
  generate the registration request message, and adding the access information to the registration request message; and
  wherein the send the registration request message to the mobility function entity comprises:
  send a user terminal initialization message, wherein the user terminal initialization message carries the registration request message.

12. The network access system according to claim 10, wherein the system further comprises an session management function entity,
  wherein the mobility function entity is further configured to: send a circuit identifier to an authentication entity; receive a result of an authentication performed by the authentication entity based on the circuit identifier; and
  wherein the session management function entity is further configured to: when the result of the authentication is that the authentication succeeds, configuring the network interface information for the user terminal.

13. The network access system according to claim 12, wherein the mobility function entity is further configured to:
  search for an authentication vector based on a fixed network access point identifier, and generate a challenge value based on the authentication vector;
  send the challenge value to the user terminal, and receive a user name and a password from the user terminal; and
  perform authentication based on the user name, the password, and the challenge value, and obtain an authentication result.

14. The network access system according to claim 12, wherein the mobility function entity is further configured to:
  generate an NAS reply message, add an internet protocol (IP) address to the NAS reply message.

15. The network access system according to claim 10, wherein the mobility function entity is further configured to: send an internet protocol (IP) address to the user terminal by using an IP configuration message or a network control protocol (NCP) message.

16. The network access apparatus according to claim 8, wherein the access information comprises a circuit identifier.

17. The network access system according to claim 10, wherein the access information comprises a circuit identifier.

18. A network access method, comprising
  receiving, by an access gateway, a point-to-point Over Ethernet (PPPoE) message from a user terminal;
  obtaining, by the access gateway, access information of the user terminal comprised in the PPPoE message;
  encapsulating, by the access gateway, the access information into a registration request message;
  sending, by the access gateway, the registration request message to a mobility function entity;
  receiving, by the mobility function entity, the registration request message;
  sending, by the mobility function entity, network interface information to the access gateway;
  receiving, by the access gateway, the network interface information, and
  sending, by the access gateway, the network interface information to the user terminal, wherein the network interface information is for accessing a network.

19. The network access method according to claim 18, further comprising:
  generating, by the access gateway, the registration request message;
  adding, by the access gateway, the access information to the registration request message; and
  wherein the sending, by the access gateway, the registration request message to the mobility function entity comprises:

send a user terminal initialization message, wherein the user terminal initialization message carries the registration request message.

20. The network access method according to claim 18, wherein the access information comprises a circuit identifier.

21. The network access method according to claim 20, further comprising:
- sending, by the mobility function entity, the circuit identifier to an authentication entity;
- receiving, by the mobility function entity, a result of an authentication performed by the authentication entity based on the circuit identifier; and
- when the result of the authentication is that the authentication succeeds, configuring, by a session management function entity, the network interface information for the user terminal.

* * * * *